Oct. 4, 1966   H. G. QUICK, JR., ETAL   3,277,369
PERMANENT MAGNET CORE TYPE METER MOVEMENT
Filed Sept. 26, 1962

Howard G. Quick, Jr.
Loren J. Craig
INVENTORS

BY R. Frank Smith
Robert W. Hampton
ATTORNEYS

United States Patent Office 3,277,369
Patented Oct. 4, 1966

3,277,369
PERMANENT MAGNET CORE TYPE METER MOVEMENT
Howard G. Quick, Jr., and Loren J. Craig, Rochester, N.Y., assignors to Eastman Kodak Company, Rochester, N.Y., a corporation of New Jersey
Filed Sept. 26, 1962, Ser. No. 226,687
4 Claims. (Cl. 324—151)

The present invention relates to pivoted-coil electric measuring instruments and more particularly to bearing-mount structures for such instruments.

The development of highly efficient magnetic materials has permitted the designers of pivoted-coil electric measuring instruments to replace the bulky external permanent magnets of the older instruments with permanent magnet cores of much smaller and lighter construction. The available strength of the newer core magnets has permitted substantial miniaturization of the entire instrument. In order to achieve further miniaturization of such an instrument, its coil may be rotated on bearing members which extend inwardly from a frame that supports the coil and which cooperate with complementary bearing members that are supported in adjustable relation to the permanent magnet core in alignment with its axis.

Although instruments constructed according to the above general design have been substantially miniaturized, they have presented a serious problem with regard to adjustable support of their bearing members. The stronger magnetic materials are so hard that they must be cast or sintered and then finished by grinding, and considerable expense has attended the construction of prior art core-magnet instruments with sufficiently accurate dimensions to locate the bearing supports properly in relation to the core magnet.

It is an object of the present invention to support the bearing members of a pivoted-coil electric measuring instrument by members other than the permanent core magnet, such members being located by only one surface of the core magnet.

Figure 1:
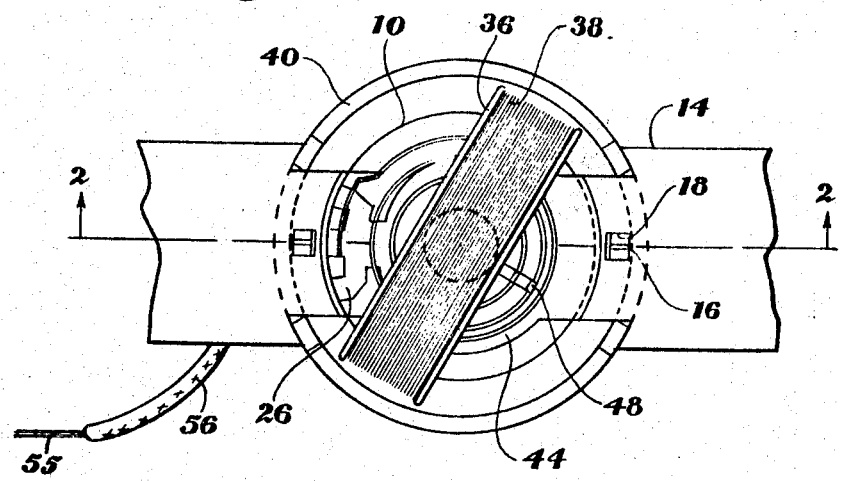
Figure 2:
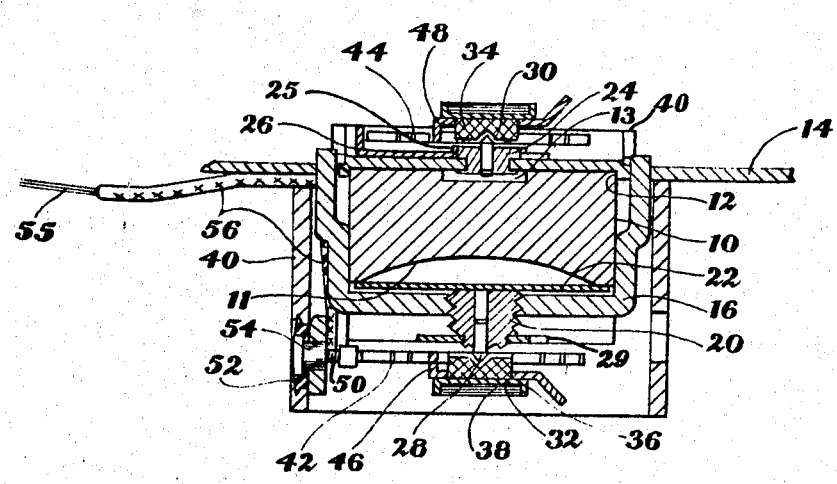

Other objects of the invention will appear from the following description, reference being made to the accompanying drawings, wherein:

FIG. 1 is a top view of an instrument constructed according to the invention; and FIG. 2 is a sectional side view of the instrument shown in FIG. 1, taken along line 2—2 of FIG. 1.

Referring to the drawings, one form of an instrument embodying the present invention comprises a cylindrical permanent magnet core 10 having a finished upper transverse surface by which it is mounted, and preferably cemented, against a shallow embossing 12 of an instrument frame 14. The ends of a U-shaped bracket 16 extend through apertures such as 18 in the instrument frame 14 and are staked or otherwise secured to that frame.

A bearing member comprises a pivot holder 20, which is threadably engaged with an aperture in the base of the U-shaped bracket 16. A spring 22 is held between the bottom transverse surface of core magnet 10 and the top surface of pivot holder 20. This spring maintains an upward pressure on the core magnet 10 to seat the latter firmly against the instrument frame 14 and thereby maintain the magnet 1 firmly in contact with frame 14. Spring 22 also applies a downward pressure against pivot holder 20 for eliminating end play between the pivot holder 20 and bracket 16. This construction has been found to minimize the need for sealing the pivot holder 20 to the bracket.

A toothed adjusting member 29 is secured to or made integral with pivot holder 20 and is engageable by a suitable tool (not shown) for turning the pivot holder about its axis in order to adjust the bearings. A concave recess 11 in the lower surface of core magnet 10 is provided to permit upward adjustment of pivot holder 20, in order that the instrument pivots and bearings, described hereinafter, can engage each other.

Another bearing member comprises a pivot holder 24, which extends through an aperture in the instrument frame 14 in axial alignment with the core magnet and with pivot holder 20. Pivot holder 24 is riveted or otherwise secured to frame 14 and is received in a shallow recess 13 in the upper surface of core magnet 10. A shoulder 25 in pivot holder 24 is adapted to maintain a zero regulator 26 in frictional engagement with the upper surface of frame 14.

The bearing members described above also comprise a pair of pivots 28 and 30, which are mounted in central bores in the pivot holders 20 and 24, respectively. Pivots 28 and 30 are complementary to and cooperate with a pair of bearings 32 and 34, respectively, which are secured to the inner surface of a coil frame 36. A coil 38 is wound on frame 36 in a manner well known in the art. The coil and its frame, along with bearings 32 and 34, are adapted for angular movement about pivots 28 and 30 in a space between core magnet 10 and a cylindrical magnetic return member 40, which is secured to frame 14 in substantially concentric relation to the axis of the core magnet. The return member 40 is a soft iron member surrounding the core magnet 10 and spaced from the magnet 10 and coil frame 36 to form a return path for magnetic flux of the magnet and to form respective arcuate paths of movement for the pair of opposite, vertical sides of the coil frame.

A lower flat spiral return spring 42 has its inner end secured to an anchor member 46, which turns with coil frame 36. The outer end of spring 42 is secured to a terminal pin 50, described hereinafter. The inner end of an upper flat spiral return spring 44 is secured to a second anchor member 48, which also turns with the coil frame 36. The outer end of spring 44 is secured to the previously mentioned zero regulator 26, which can be moved angularly to adjust the tension of spring 44.

The terminal pin 50 has a disk 54, for example of hexagonal shape, integral therewith and is secured to the magnetic return member 40 by means of an electrically insulating bushing 52 in which disk 54 is embedded to prevent pin 50 from turning. An electrical lead 55 from a photocell (not shown) is wrapped with insulation 56 and extends through an aperture in the magnetic return member 40 for soldering to the terminal pin 50. The electrical circuit of the instrument extends from lead 55 through terminal pin 50, spring 42, anchor member 46, coil 38, anchor member 48, spring 44, and zero regulator 26 to instrument frame 14, which is returned to the photocell either directly or through a battery or other power source (not shown).

The invention has been described in detail with particular reference to a preferred embodiment thereof, but it will be understood that variations and modifications can be effected within the spirit and scope of the invention as described hereinabove and as defined in the appended claims. In particular it is noted that the complementary bearing members obviously may be interchanged, by mounting the pivots 28 and 30 on the coil frame 36, and by mounting bearings 32 and 34 on bracket 16 and instrument frame 14, respectively.

We claim:

1. A pivoted-coil electric measuring instrument comprising, in combination: an instrument frame having a central boss; a fixed position U-shaped bracket having a pair of ends secured to the frame on either side of the boss and a base portion spaced from the frame; a cylindrical permanent core magnet having a core axis and disposed between the ends of the U-shaped bracket and having one transverse surface resting in the boss of the instrument frame with an opposed transverse surface spaced from the base portion; a coil frame of substantially rectangular form disposed with the magnet and bracket within the coil frame and a coil wound on the coil frame; a cylindrical soft iron return member surrounding the magnet in substantially concentric relation thereto along the core axis and spaced from the magnet, bracket and coil frame to form a return path for magnetic flux of said magnet and to form respective arcuate paths of movement for a first pair of opposite sides of said coil frame; a first bearing member secured to the instrument frame on the core axis; a second bearing member supported on the core axis to the base of the U-shaped bracket in alignment with the first bearing member and threaded holder means to adjust the position of the second bearing member along the core axis and relative to the bracket; third and fourth bearing members secured respectively to the inner surfaces of the other pair of opposite sides of the coil frame in complementary cooperative relation with the first and second bearing members, respectively, to permit angular movement of the coil frame and third and fourth bearing members about the core axis; and spring means mounted in the space between the U-shaped bracket base portion and the magnet to maintain the magnet firmly in contact with the frame and to apply pressure to the holder means and eliminate end play between the second bearing member and the U-shaped bracket base portion.

2. The instrument defined in claim 1 and further comprising a pair of anchor members, each mounted on one of the other opposite sides about the respective bearing member, and a pair of flat spiral return springs each having an inner end fixed to a respective anchor member.

3. The instrument as defined in claim 2 and further comprising a terminal pin to which the outer end of one return spring is fixed, and an electrically conductive adjustable zero regulator to which the other return spring outer end is fixed.

4. The instrument defined in claim 1, wherein said one transverse surface of the permanent magnet is cemented to said instrument frame.

References Cited by the Examiner
UNITED STATES PATENTS 1,792,385   2/1931   Matthews _____ 324—155

FOREIGN PATENTS 971,342   1/1959   Germany.

OTHER REFERENCES

AIEE Publication—"A New Instrument Mechanism," by Stimson, Jennings and McCarty, AIEE Miscellaneous Paper 49–162, May 1949.

WALTER L. CARLSON, *Primary Examiner.*

R. V. ROLINEC, *Assistant Examiner.*